United States Patent
Matsubara et al.

(10) Patent No.: US 12,494,644 B2
(45) Date of Patent: Dec. 9, 2025

(54) POWER SUPPLY CONTROLLER

(71) Applicant: TOYOTA JIDOSHA KABUSHIKI KAISHA, Aichi-ken (JP)

(72) Inventors: Takuji Matsubara, Aichi-ken (JP); Osamu Yumita, Aichi-ken (JP); Naoki Hasegawa, Aichi-ken (JP); Sa Kano, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/416,889

(22) Filed: Jan. 19, 2024

(65) Prior Publication Data
US 2024/0250531 A1    Jul. 25, 2024

(30) Foreign Application Priority Data
Jan. 20, 2023    (JP) ................... 2023-007544

(51) Int. Cl.
*H02J 3/00*    (2006.01)
*B60L 55/00*   (2019.01)
*H02J 3/32*    (2006.01)

(52) U.S. Cl.
CPC ............ *H02J 3/0073* (2020.01); *B60L 55/00* (2019.02); *H02J 3/322* (2020.01)

(58) Field of Classification Search
None
See application file for complete search history.

(56) References Cited

U.S. PATENT DOCUMENTS

| | | | |
|---|---|---|---|
| 2020/0161859 A1* | 5/2020 | Bell | H02J 3/14 |
| 2021/0213843 A1* | 7/2021 | Nishio | B60L 53/60 |
| 2021/0273453 A1* | 9/2021 | Nishio | H02J 3/32 |
| 2023/0297047 A1* | 9/2023 | Lemsaddek | H02J 7/0013 |
| | | | 700/295 |

FOREIGN PATENT DOCUMENTS

| | | |
|---|---|---|
| JP | H09-065583 A | 3/1997 |
| JP | 2020-010442 A | 1/2020 |

* cited by examiner

*Primary Examiner* — Rexford N Barnie
*Assistant Examiner* — Aqeel H Bukhari
(74) *Attorney, Agent, or Firm* — HAUPTMAN HAM, LLP

(57) ABSTRACT

The power supply controller controls the supply of electric power from a first power supply source to a predetermined facility having a first power supply destination and a second power supply destination, and also controls the supply of electric power to the predetermined facility from the second power supply source that is powered by a battery installed in a plurality of electric vehicles parked in a parking lot attached to the predetermined facility. The power supply controller prioritizes the first power supply source over the second power supply source when there is an abnormality in the first power supply source.

5 Claims, 4 Drawing Sheets

POWER SUPPLY CONTROLLER

CROSS-REFERENCE TO RELATED APPLICATIONS

The present disclosure claims priority to Japanese Patent Application No. 2023-007544 filed Jan. 20, 2023, which is incorporated herein by reference.

TECHNICAL FIELD

The present disclosure relates to the power supply controller, in particular, to the power supply controller that controls the power supply to the predetermined facility from the first power supply source and the supply of electric power to the predetermined facility from the second power supply source, which is the battery installed in a plurality of electric vehicles parked in the parking lot attached to the predetermined facility.

BACKGROUND

Conventionally, a system with a storage battery installed in a parking lot, an AC power converter for this storage battery, and a charging and discharging stand for electric vehicles has been proposed that can also supply power to a load from the charging and discharging stand or the AC power converter (for example, refer to Patent Document 1). In this system, power is supplied to the load from a charging and discharging stand or an AC power converter, so that power can be supplied to the load even in the event of a failure of the commercial power system.

CITATION LIST

Patent Literature

PTL: 2020-010442

SUMMARY

In the case of a system that supplies power to loads from a first power supply source with storage batteries and an AC-DC power conversion device and a second power supply source with an electric vehicle and the charging and discharging device, if the first power supply source cannot supply power to the loads due to an abnormality in the first power supply source caused by a disaster or power failure, the system that supplies power to loads from the second power supply source. However, if the power supplied by the second power source is not sufficient to cover the power consumption of the load, a number of inconveniences will occur.

The main purpose of the power supply controller of the present disclosure is to properly deal with an abnormality in the first power supply source.

The power supply controller of the present disclosure has adopted the following means to achieve the main objectives described above.

The power supply controller of this disclosure controls the supply of electric power from a first power supply source to a predetermined facility having a first power supply destination and a second power supply destination, and also controls the supply of electric power to the predetermined facility from the second power supply source that is powered by a battery installed in a plurality of electric vehicles parked in a parking lot attached to the predetermined facility, the power supply controller is characterized by: the power supply controller prioritizes the first power supply destination over the second power supply destination when there is an abnormality in the first power supply source.

The power supply controller of this disclosure controls the supply of electric power from a first power supply source to a predetermined facility having a first power supply destination and a second power supply destination, and also controls the supply of electric power to the predetermined facility from the second power supply source that is powered by a battery installed in a plurality of electric vehicles parked in a parking lot attached to the predetermined facility. The power supply controller prioritizes the first power supply destination over the second power supply destination when there is an abnormality in the first power supply source. By selecting an electrical facility with a high priority as the first power supply destination, a more appropriate response can be taken in the event of an abnormality in the first power supply source.

DESCRIPTION OF EMBODIMENTS

Figure 1:
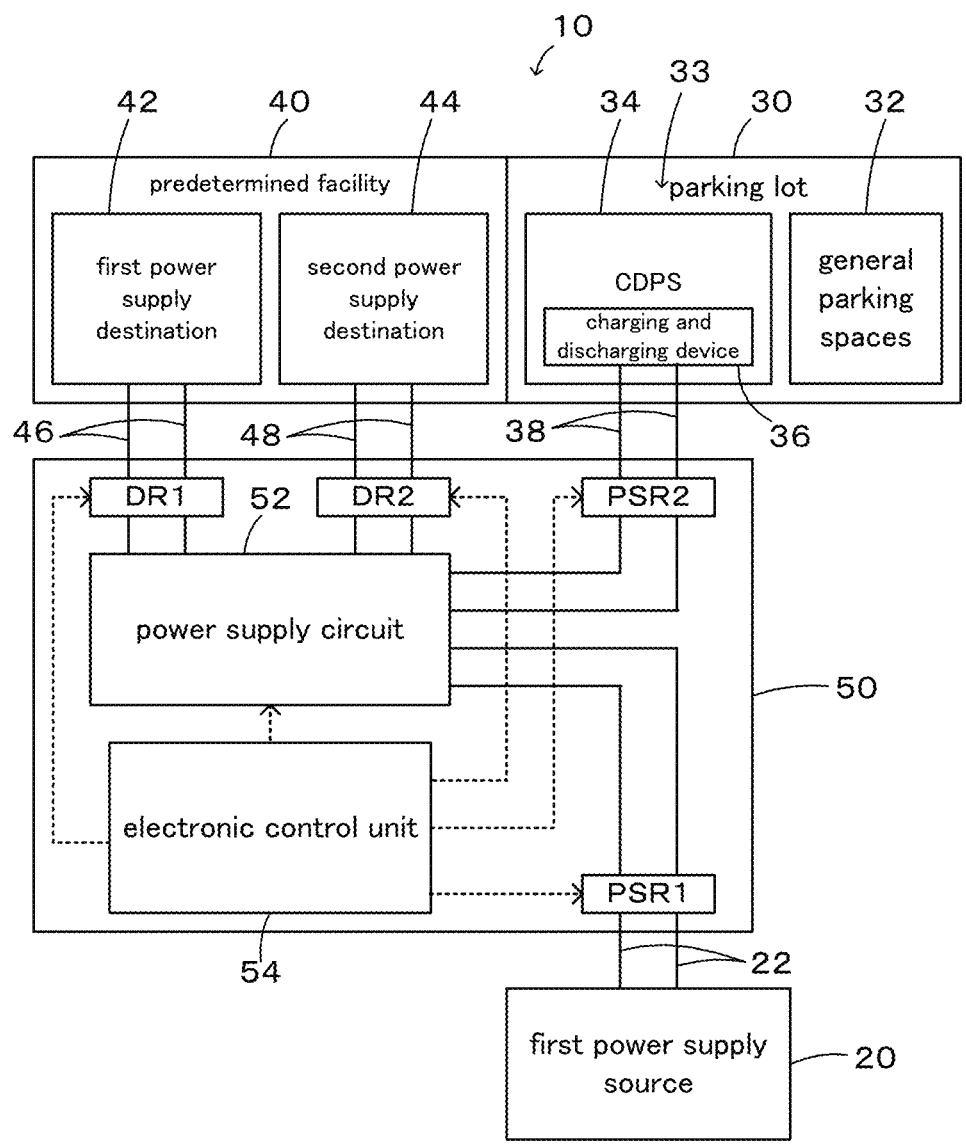
FIG. 1 shows a configuration diagram illustrating a schematic of the power supply system 10 including the power supply controller 50 as one embodiment of this disclosure.

Next, the embodiment of this disclosure will be described. FIG. 1 shows a configuration diagram illustrating a schematic of the power supply system 10 including the power supply controller 50 as one embodiment of this disclosure. The power supply system 10 of the embodiment has the first power supply source 20, the second power supply source 33, the predetermined facility 40 including the first power supply destination 42 and the second power supply destination 44, and the power supply controller 50, as shown in the figure.

The first power supply source 20 is configured to include at least some of various power sources, such as solar power supply, commercial power supply, wind power supply, tidal power supply, geothermal power supply, and so on.

The second power supply source 33 consists of the batteries installed in a plurality of electric vehicles parked in the chargeable and dischargeable parking space 34 of the parking lot 30 attached to the predetermined facility 40, and the charging and discharging device 36 installed in the chargeable and dischargeable parking space 34 to charge and discharge the batteries installed in the electric vehicles. The parking lot 30 has chargeable and dischargeable parking space 34 as well as general parking spaces 32 that are not equipped with charging and discharging devices 36.

The predetermined 40 will facility be described assuming an airport as an embodiment, but it can also be a large leisure facility with hotels, a shopping center, a railroad station, a port, and so on. The first power supply destination 42 is the electrical facility that should be given priority over the second power supply destination 44. The first power supply destination 42 can be, in the case of an airport, the electrical equipment that has a significant effect on airplane landings (for example, the runway electrical equipment, the control tower electrical equipment, and so on). The second power supply destination 44 is the electrical facility that is preferred to provide power on a non-priority basis compared to the first power supply destination 42. The second power supply destination 44 can be an electrical facility that has little effect on the landing of airplanes in the case of an airport (for example, electrical facilities in the passenger terminal).

The power supply controller 50 includes the first power supply system relay PSR1, the second power supply system relay PSR2, the first supply system relay DR1, the second supply system relay DR2, the power supply circuit 52, and the electronic control unit 54.

The first power supply system relay PSR1 is a relay that connects and disconnects the first power supply source 20 and the power supply circuit 52. The first power supply system relay PSR1 is attached to the first power supply line 22 that connects the first power supply source 20 to the power supply circuit 52.

The second power supply system relay PSR2 is a relay that connects and disconnects the second power supply source 33 and the power supply circuit 52. The second power supply system relay PSR2 is attached to the second power supply line 38 that connects the second power supply source 33 to the power supply circuit 52. The first supply system relay DR1 is a relay that connects and disconnects the first power supply destination 42 and the power supply circuit 52. The first supply system relay DR1 is attached to the first supply line 46 that connects the first power supply destination 42 and the power supply circuit 52.

The second supply system relay DR2 is a relay that connects and disconnects the second power supply destination 44 and the power supply circuit 52. The second supply system relay DR2 is attached to the second supply line 48 that connects the second power supply destination 44 to the power supply circuit 52.

The power supply circuit 52 is configured as a circuit that adjusts the voltage of the power supplied from the first power supply source 20 and the voltage of the power supplied from the second power supply source 33 and applies to the first power supply destination 42 and the second power supply destination 44.

The electronic control unit 54, not shown, is configured as a microcomputer with a CPU at its core. The electronic control unit 54 inputs the first power supply voltage Vs1 from the voltage sensor (not shown) attached to the first power supply line 22, the first power supply current Is1 from the current sensor (not shown) attached to the first power supply line 22, the second power supply voltage Vs2 from the voltage sensor (not shown) attached to the second power supply line 38, the second supply current Is2 from the current sensor (not shown) attached to the second power supply line 38, the first supply voltage Vd1 from the voltage sensor (not shown) attached to the first supply line 46, the second supply current Id1 from the current sensor (not shown) attached to the first supply line 46, the second supply voltage Vd2 from the voltage sensor (not shown) attached to the second supply line 48, and the second supply current Id2 from the current sensor (not shown) attached to the second supply line 48, and so on. The electronic control unit 54 also outputs the drive control signals to the first power supply system relay PSR1, the second power supply system relay PSR2, the first supply system relay DR1, and the second supply system relay DR2, and the drive control signals to the power supply circuit 52.

Figure 2:
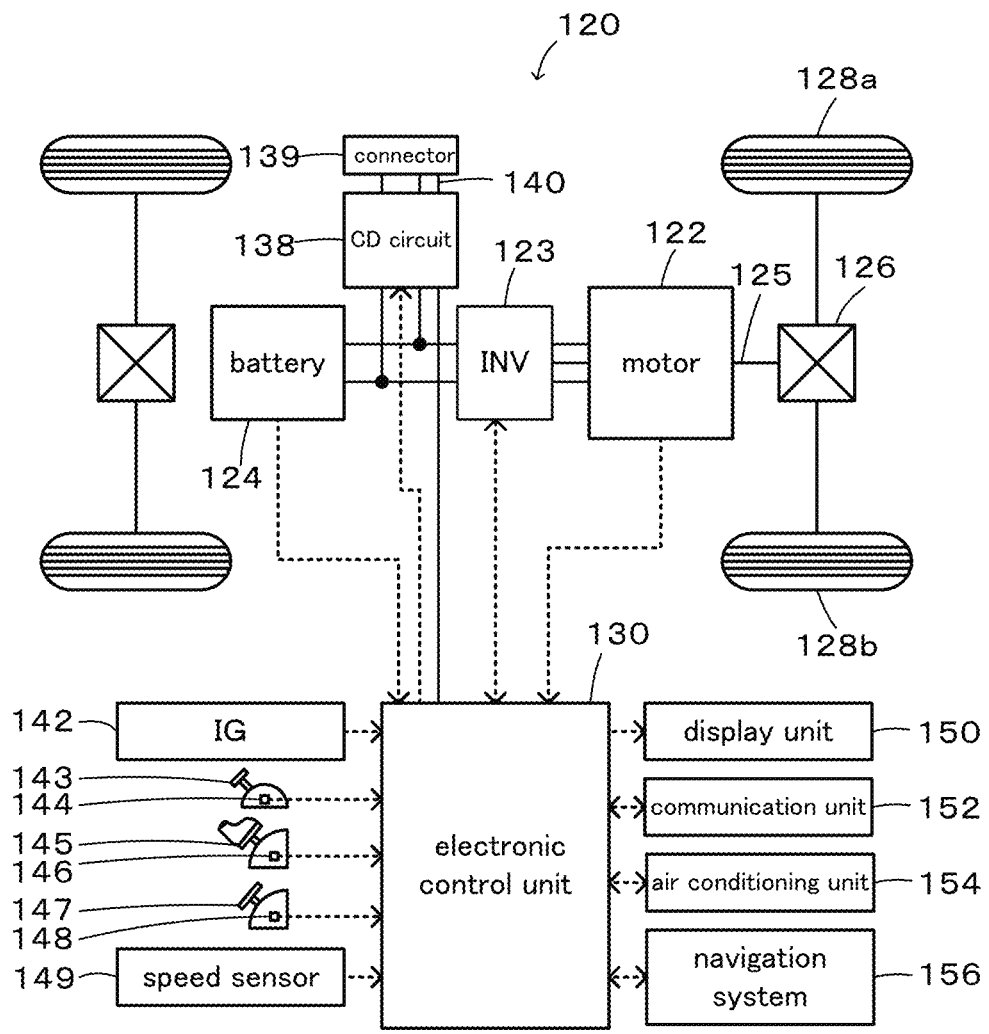
FIG. 2 shows a configuration diagram illustrating a schematic of the vehicle configurations that can use the chargeable and dischargeable parking space 34 in the parking lot 30.

A vehicle that can use the chargeable and dischargeable parking space 34 of parking lot 30 can be, for example, the electric vehicle 120 illustrated in FIG. 2. The electric vehicle 120 is equipped with the motor 122, the inverter 123, the battery 124, the charging and discharging circuit 138, the connector 139, and the electronic control unit 130.

The motor 122 is configured, for example, as the synchronous generator motor. The rotor of the motor 122 is connected to the drive shaft 125 connected to the drive wheels 128a, 128b via the differential gear 126. The motor 122 is driven by three-phase AC power applied by the inverter 123 after DC power from the battery 124 is converted to three-phase AC power by the inverter 123. The battery 124 is configured as a well-known lithium-ion rechargeable battery or nickel-metal hydride rechargeable battery.

The charging and discharging circuit 138 is connected at one end to a power line connected to the battery 124 and at the other end to the connector 139 for connection to the charging and discharging device 36. The charging and discharging circuit 138 has the charging and discharging relay, which is not shown in the figure. The charging and discharging circuit 138 is connected to and disconnected from the battery 124 by the charging and discharging relay.

The electronic control unit 130 is configured as a microcomputer, which is mainly composed of a CPU, not shown in the figure. The electronic control unit 130 receives signals from various sensors via input ports. For example, the electronic control unit 130 inputs the ignition signal from the ignition switch 142, the shift position SP from the shift position sensor 144 that detects the position of the shift lever 143, the acceleration Acc from the accelerator pedal position sensor 146 that detects the amount of depressing the accelerator pedal 145, the brake position BP from the brake pedal position sensor 148 that detects the amount of depressing the brake pedal 147, and the vehicle speed V from the speed sensor 149. The electronic control unit 130 also inputs the rotation position θ from the rotation position sensor (not shown) that detects the rotation position of the motor 122, the battery voltage Vb from the voltage sensor (not shown) attached to the output terminal of the battery 124, the battery current Ib from the current sensor (not shown) attached to the output terminal of the battery 124, the charging and discharging voltage Vchg from the voltage sensor attached to the charging and discharging circuit 138, and the charging and discharging current Ichg from the current sensor attached to the charging and discharging circuit 138.

The electronic control unit 130 outputs various control signals via output ports. For example, the electronic control unit 130 outputs the display control signals to the display unit 150, the communication control signals to the communication unit 152, and the air conditioning control signals to the air conditioning unit 154. The electronic control unit 130 also outputs the switching control signals for switching the switching elements (not shown) to the inverter 123 to drive the motor 122, the drive control signals to the system main relay (not shown) mounted near the battery 124, and the drive control signal to the charging and discharging relay (not shown) attached to the charging and discharging circuit 138. The electronic control unit 130 communicates with the navigation system 156, which displays various information and provides route guidance. The electronic control unit 130 has the signal line 140 connected to it to communicate with the charging and discharging device 36 when the charging and discharging device 36 is connected via the connector 139.

The power supply controller 50 of the embodiment supplies power to the predetermined facility from the first power supply source 20 and the second power supply source 33 when the available power from the first power supply source 20 is greater than the power consumption of the predetermined facility 40 (the first power supply destination 42 and the second power supply destination 44) during ordinary times. The power supply controller 50 supplies power from the first power supply source 20 to the predetermined facility 40 and the second power supply source 33 when the available power from the first power supply source 20 is less than the power consumption of the predetermined facility 40. In supplying power from the first power supply source 20 to the second power supply source 33, the power supplied from the first power supply source 20 is used to charge the battery on the parked electric vehicle, thereby increasing the amount of power that can be supplied by the second power supply source 33.

Figure 3:
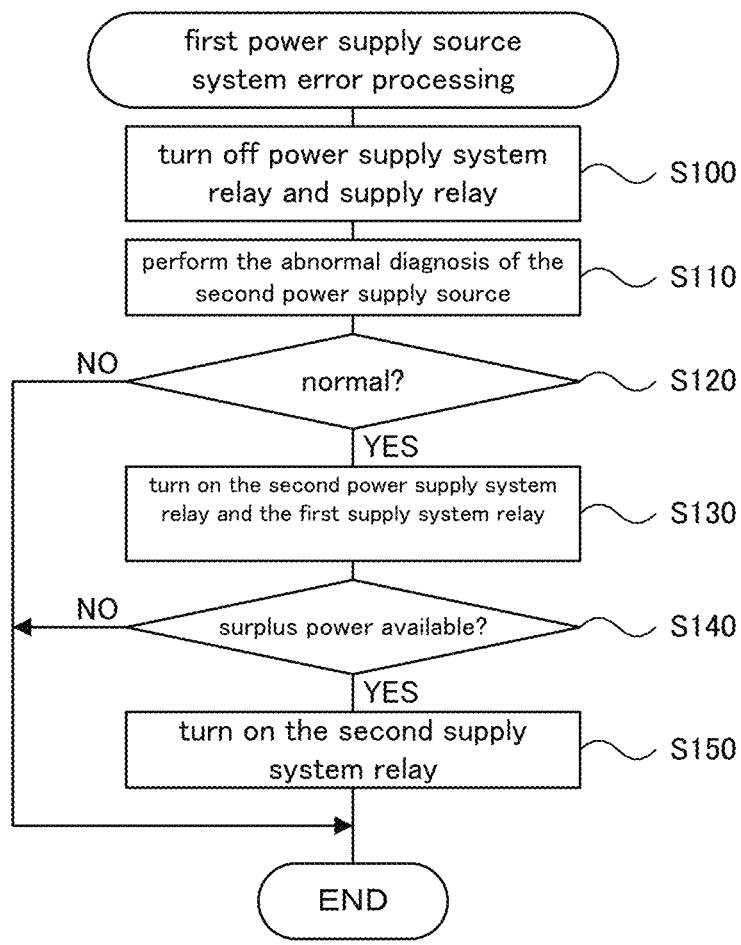
FIG. 3 shows a flowchart of an example of the first power supply source system error processing executed by the electronic control unit 54.

Next, the operation of the power supply controller 50 of the embodiment, especially when an abnormality occurs in the system of the first power supply source 20 due to a disaster or power failure, is described. FIG. 3 is a flowchart showing an example of the first power supply source system error processing executed by the electronic control unit 54 when an error occurs in the system of the first power supply source 20.

When the first power supply source system error processing is executed, the electronic control unit 54 first turns off the first power supply system relay PSR1, the second power supply system relay PSR2, the first supply system relay DR1, and the second supply system relay DR2 (step S100). The electronic control unit 54 performs the abnormal diagnosis to determine whether or not the system of the second power supply source 33 has an abnormality (steps S110 and S120). The abnormal diagnostics include diagnosing whether or not the charging and discharging device 36 is abnormal, whether or not the second power supply line 38 is disconnected, and whether or not the second power supply source 33 system is leaking power. When the electronic control unit 54 determines in step S120 that there is an abnormality in the system of the second power supply source 33, it terminates this process without supplying power to either the first power supply destination 42 or the second power supply destination 44.

When the electronic control unit 54 determines in step S120 that there is no abnormality (normal) in the system of the second power supply source 33, it turns on the second power supply system relay PSR2 and the first supply system relay DR1 to supply power from the second power supply source 33 to the first power supply destination 42 (step S130). That is, the second power supply source 33 supplies power to the first power supply destination 42 on a priority basis. In this way, when the predetermined facility 40 is an airport and the first power supply destination 42 is an electrical facility that has a significant effect on the landing of airplanes (for example, the runway electrical facility or the control tower electrical facility), the landing of airplanes can be performed more properly even when there is an abnormality in the system of the first power supply source 20.

Next, the electronic control unit 54 determines whether or not there is surplus power available to supply from the second power supply source 33 to the first power supply destination 42 even after supplying power from the second power supply source 33 (step S140). This determination can be made by comparing the power consumption of the first power supply destination 42 with the available power supply that is the power converted from the number of electric vehicles connected to the charging and discharging device 36 in the second power supply source 33. When the electronic control unit 54 determines that there is surplus power available to supply from the second power supply source 33, it turns on the second supply system relay DR2 to supply power from the second power supply source 33 to the second power supply destination 44 (step S150) and terminates this process. On the other hand, when the electronic control unit 54 determines that there is no margin for power supply from the second power supply source 33, it terminates this process without supplying power to the second power supply destination 44.

In the embodiment of the power supply controller 50 described above, when an abnormality occurs in the first power supply source 20, the second power supply source 33 supplies power to the first power supply destination 42 on a priority basis. In this way, when the predetermined facility 40 is an airport and the first power supply destination 42 is an electrical facility that has a significant effect on the landing of airplanes (for example, the runway electrical facility or the control tower electrical facility), the landing of airplanes can be performed more properly even when there is an abnormality in the system of the first power supply source 20.

In the power supply controller 50 of the embodiment, when an abnormality occurs in the first power supply source 20, the abnormal diagnosis as to whether or not the system of the second power supply source 33 has an abnormality is performed before supplying power from the second power supply source 33 to the first power supply destination 42. However, it is acceptable not to perform such an abnormality diagnosis.

Figure 4:
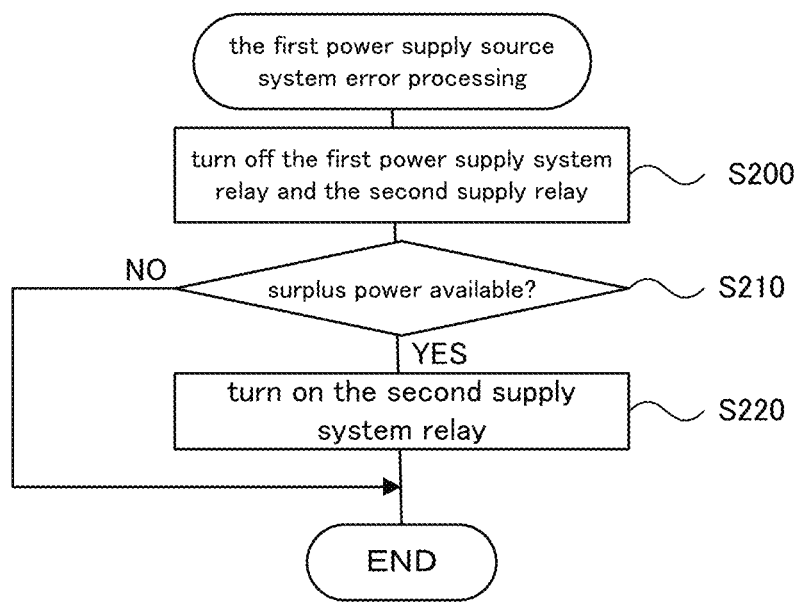
FIG. 4 shows a flowchart of an example of the first power supply source system error processing executed in the modified example.

In the power supply controller 50 of the embodiment, the first power supply system relay PSR1, second power supply system relay PSR2, first supply system relay DR1, and second supply system relay DR2 shall be turned off when an error occurs in the system of the first power supply source 20 due to disaster or power failure. However, when an abnormality occurs only in the system of the first power supply source 20, the first power supply system relay PSR1 and the second supply system relay DR2 may be turned off without turning off the second power supply system relay PSR2 and the first supply system relay DR1. In this case, the electronic control unit 54 should perform the first power supply source system error processing executed illustrated in FIG. 4. In the first power supply source system error processing executed in FIG. 4, the electronic control unit 54 turns off the first power supply system relay PSR1 and the second supply system relay DR2 when an error occurs only in the first power supply source 20 system (step S200). In this way, the power supply from the second power supply source 33 to the first power supply destination 42 can continue uninterrupted. Since this modified example assumes that an abnormality occurs only in the system of the first power supply source 20, there is no need for the abnormal diagnosis to determine whether or not an abnormality occurs in the system of the second power supply source 33. The electronic control unit 54 then determines whether or not there is enough power available from the second power supply source 33 to the first power supply destination 42 (step S210). When the electronic control unit 54 determines that there is enough power supply from the second power supply source 33, it turns on the second supply system relay DR2 to supply power from the second power supply source 33 to the second power supply destination 44 (step S220) and terminates this process. On the other hand, when the electronic control unit 54 determines that there is no margin for power supply from the second power supply source 33, it terminates this process without supplying power to the second power supply destination 44. In such a modified power supply controller 50, the power supply from the second power supply source 33 to the first power supply destination 42 can continue without interruption when an abnormality occurs only in the system of the first power supply source 20.

In the embodiment of the power supply controller 50, the electric vehicle 120 that drives the motor 122 using the power from the battery 124 to drive the motor 122 as the vehicle that can use the chargeable and dischargeable parking space 34 in the parking lot 30 is assumed. However, since a vehicle can be equipped with a chargeable and dischargeable battery, it can be a hybrid vehicle with an engine, motor, and battery, or a fuel cell vehicle with a fuel cell and battery, or various other configurations.

In the power supply controller of the present disclosure, the power supply controller may supply power from the second power supply source to the second power supply destination when there is surplus power available to supply power from the second power supply source to the first power supply destination in the event of an abnormality in the first power supply source. In this way, when an abnormality occurs in the first power supply source, the second power supply destination can also be supplied with power.

In the power supply controller of the present disclosure, the predetermined facility may be an airport; the first power supply destination may be an electrical facility that has a large effect on airplane landings; and the second power supply destination may be an electrical facility that has little effect on the landing of airplanes. In this way, when an abnormality occurs in the first power supply source, power can be preferentially supplied from the second power supply source to electrical equipment that has a large impact on airplane landing, allowing for more appropriate airplane landing. Electrical facilities that have a significant effect on airplane landings include, for example, the runway electrical facilities and the control tower electrical facilities. On the other hand, electrical facilities that have little effect on airplane landings include the electrical facilities at the passenger terminals.

In the power supply controller of the present disclosure, the first power supply source may include at least some of commercial power supply, solar power supply, wind power supply, tidal power supply, and geothermal power supply.

In the power supply controller of the present disclosure, the power supply controller may supply power to the predetermined facility from the first power supply source and the second power supply source when the available power from the first power supply source is less than the power consumption at the predetermined facility; the power supply controller may supply power from the first power supply source to the predetermined facility and the second power supply source when the available power from the first power supply source is greater than the power consumption at the predetermined facility. In this way, the power supplied from the first power source can be used in a stable manner. The power supply from the first power source to the second power source can be increased by using the power supplied from the first power source to charge the battery on the parked electric vehicle.

In the power supply controller of the present disclosure, the power supply controller may perform an error diagnosis on the power supply from the second power supply source when an error occurs in the first power supply source, and may start supplying power from the second power supply source when it obtains a diagnostic result that there is no abnormality in the power supply from the second power supply source. In this way, the second power source can supply power to the predetermined facility in a more appropriate manner.

The following is an explanation of the correspondence between the main elements of the embodiment and the main elements of the invention described in the section on means to solve the problem. In the embodiment, the first power supply source 20 corresponds to "first power supply source", the second power supply source 33 corresponds to "second power supply source", the predetermined facility 40 corresponds to "the predetermined facility", the first power supply destination 42 corresponds to "the first power supply destination," the second power supply destination 44 corresponds to "the second power supply destination," and the power supply controller 50 corresponds to "the power supply controller."

The correspondence between the major elements of the embodiment and the major elements of the invention described in the means to solve a problem section is an example of how the embodiment can be used to specifically explain the embodiment of the invention described in the means to solve a problem section. This does not limit the elements of the invention described in the means to solve the problem section. In other words, interpretation of the invention described in the means to solve a problem section should be based on the description in that section, and the embodiment is only one specific example of the invention described in the means to solve a problem section.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

This disclosure is applicable to the manufacturing industry for power supply controllers and other applications.

The invention claimed is:

1. A power supply controller configured to control supply of electric power from a first power supply source to a predetermined facility having a first power supply destination and a second power supply destination, and also control supply of electric power to the predetermined facility from a second power supply source that is powered by a battery installed in each of a plurality of electric vehicles parked in a parking lot attached to the predetermined facility, wherein
the power supply controller is configured to prioritize the first power supply destination over the second power supply destination in response to an abnormality in the first power supply source, and
the power supply controller is configured to, in response to the abnormality in the first power supply source,
determine whether there is surplus electric power available to supply electric power from the second power supply source to the first power supply destination, and
control supply of electric power from the second power supply source to the second power supply destination upon determining that there is surplus electric power available to supply electric power from the second power supply source to the first power supply destination.

2. The power supply controller according to claim 1, wherein
the predetermined facility is an airport;
the first power supply destination is an electrical facility that has a large effect on airplane landings; and
the second power supply destination is an electrical facility that has little effect on the airplanes landings.

3. The power supply controller according to claim 1, wherein
the first power supply source includes at least some of commercial power supply, solar power supply, wind power supply, tidal power supply, and geothermal power supply.

4. The power supply controller according to claim 1, wherein
the power supply controller is configured to control supply of electric power to the predetermined facility from the first power supply source and the second power supply source in response to available power from the first power supply source being less than power consumption at the predetermined facility;
the power supply controller is configured to control supply of electric power from the first power supply source to the predetermined facility and the second power supply source in response to the available power from the first power supply source being greater than the power consumption at the predetermined facility.

5. The power supply controller according to claim 1, wherein
the power supply controller is configured to
perform an error diagnosis on the supply of electric power from the second power supply source in response to an error in the first power supply source, and
start supplying electric power from the second power supply source in response to obtaining, from the error diagnosis, a diagnostic result that there is no abnormality in the supply of electric power from the second power supply source.

* * * * *